United States Patent
Taketa et al.

(10) Patent No.: US 10,370,995 B2
(45) Date of Patent: Aug. 6, 2019

(54) GAS TURBINE ENGINE VANE END DEVICES

(71) Applicants: Rolls-Royce North American Technologies Inc., Indianapolis, IN (US); Rolls-Royce Corporation, Indianapolis, IN (US)

(72) Inventors: Linnea Taketa, Indianapolis, IN (US); John Munson, Indianapolis, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 15/824,467

(22) Filed: Nov. 28, 2017

(65) Prior Publication Data

US 2018/0156052 A1 Jun. 7, 2018

Related U.S. Application Data

(62) Division of application No. 14/132,738, filed on Dec. 18, 2013, now Pat. No. 9,938,845.

(Continued)

(51) Int. Cl.
  *F01D 5/28* (2006.01)
  *F01D 9/04* (2006.01)
  (Continued)

(52) U.S. Cl.
  CPC .............. *F01D 11/005* (2013.01); *F01D 5/28* (2013.01); *F01D 9/041* (2013.01); *F01D 11/00* (2013.01);
  (Continued)

(58) Field of Classification Search
  CPC ........ F01D 11/00; F01D 11/005; F01D 11/02; F01D 11/025; F01D 11/04; F01D 11/06;
  (Continued)

(56) References Cited

U.S. PATENT DOCUMENTS 3,117,716 A * 1/1964 Wernicke ................. F01D 5/20
  277/433
4,169,692 A * 10/1979 McDonough ........... F01D 5/189
  415/115

(Continued)

FOREIGN PATENT DOCUMENTS

| EP | 1582700 A2 | 10/2005 |
| EP | 2037083 A2 | 3/2009 |
| WO | 2011090701 A2 | 7/2011 |

OTHER PUBLICATIONS

Chupp, Raymond E. et al., "Gas Turbine Engines: Seals" in: Encyclopedia of Aerospace Engineering, Online, published by John Wiley & Sons, Ltd. in 2010.*

(Continued)

*Primary Examiner* — Christopher Verdier
(74) *Attorney, Agent, or Firm* — Barnes & Thornburg LLP

(57) ABSTRACT

A turbomachinery component of a gas turbine engine is disclosed having a number of techniques of reducing the effects of a gap flow between an airfoil member of the gas turbine engine and a wall of the gas turbine engine. The airfoil member can be variable and in one form is a variable turbine vane. In one embodiment a brush seal is included between the vane and the wall. In another form a wear surface is disposed between the vane and the wall. In yet another form a moveable member capable of being actuated to change position can be disposed between the vane and the wall to alter the size of a gap between the two.

10 Claims, 3 Drawing Sheets

Related U.S. Application Data

(60) Provisional application No. 61/769,535, filed on Feb. 26, 2013.

(51) Int. Cl.

| | | |
|---|---|---|
| *F01D 11/00* | (2006.01) | |
| *F01D 11/02* | (2006.01) | |
| *F01D 11/12* | (2006.01) | |
| *F01D 17/14* | (2006.01) | |
| *F01D 17/16* | (2006.01) | |
| *F04D 19/02* | (2006.01) | |
| *F04D 27/00* | (2006.01) | |
| *F04D 27/02* | (2006.01) | |
| *F04D 29/08* | (2006.01) | |
| *F04D 29/16* | (2006.01) | |
| *F16J 15/3288* | (2016.01) | |

(52) U.S. Cl.
CPC .......... *F01D 11/02* (2013.01); *F01D 11/025* (2013.01); *F01D 17/148* (2013.01); *F01D 17/162* (2013.01); *F01D 17/165* (2013.01); *F04D 19/02* (2013.01); *F04D 27/0246* (2013.01); *F04D 29/164* (2013.01); *F01D 11/122* (2013.01); *F04D 27/002* (2013.01); *F04D 29/083* (2013.01); *F05B 2240/571* (2013.01); *F05D 2240/56* (2013.01); *F16J 15/3288* (2013.01)

(58) Field of Classification Search
CPC .......... F01D 11/16; F01D 11/20; F01D 11/10; F01D 11/12; F01D 11/122; F01D 17/148; F01D 17/16; F01D 17/162; F01D 17/165; F01D 5/20; F04D 29/164; F04D 19/02; F04D 27/0246; F04D 27/002; F04D 29/083; F05B 2240/57; F05D 2240/55
USPC ......... 415/173.1, 173.2, 173.3, 174.1, 174.2, 415/170.1, 230, 231, 148, 150–151, 415/159–166; 416/87, 88, 89
See application file for complete search history.

(56) References Cited

U.S. PATENT DOCUMENTS

| | | | | |
|---|---|---|---|---|
| 4,193,738 | A | * | 3/1980 | Landis, Jr. ............ F01D 11/005 277/387 |
| 4,285,634 | A | * | 8/1981 | Rossman ................ F01D 5/284 416/241 B |
| 5,201,530 | A | | 4/1993 | Kelch et al. |
| 5,324,165 | A | | 6/1994 | Charbonnel et al. |
| 5,342,165 | A | | 8/1994 | Graef et al. |
| 5,752,802 | A | | 5/1998 | Jones |
| 5,752,805 | A | | 5/1998 | Alfons et al. |
| 6,210,106 | B1 | | 4/2001 | Hawkins |
| 6,536,773 | B2 | | 3/2003 | Datta |
| 6,808,364 | B2 | | 10/2004 | O'Reilly et al. |
| 6,915,574 | B2 | | 7/2005 | Mesing et al. |
| 7,163,369 | B2 | | 1/2007 | Bruce |
| 7,410,173 | B2 | | 8/2008 | Justak |
| 7,445,427 | B2 | | 11/2008 | Gutknecht et al. |
| 7,473,073 | B1 | | 1/2009 | Liang |
| 7,549,841 | B1 | | 6/2009 | Marussich |
| 7,607,893 | B2 | | 10/2009 | Lee et al. |
| 2003/0227174 | A1 | * | 12/2003 | Bayly .................. F03D 7/0248 290/55 |
| 2005/0008481 | A1 | * | 1/2005 | Nottin ...................... F01D 5/20 415/173.1 |
| 2005/0175447 | A1 | | 8/2005 | Garner |
| 2007/0160463 | A1 | | 7/2007 | Jahns |
| 2009/0074563 | A1 | | 3/2009 | McCaffrey et al. |
| 2009/0238682 | A1 | | 9/2009 | Clemen |
| 2010/0266408 | A1 | * | 10/2010 | Dawson ................ H02G 13/00 416/87 |
| 2013/0195633 | A1 | * | 8/2013 | Hildebrand ............... F01D 5/20 415/173.4 |
| 2013/0277918 | A1 | | 10/2013 | Fitzgerald et al. |

OTHER PUBLICATIONS

International Search Report and the Written Opinion for International Application No. PCT/US2013/076291, dated Dec. 18, 2013, (14 pages).

Official Action dated Jul. 10, 2018 and issued in connection with EP Appln. No. 13818141.7.

Official Action for European Application No. 13818141.7-1006, dated Jan. 23, 2019, 9 pages.

* cited by examiner

GAS TURBINE ENGINE VANE END DEVICES

CROSS REFERENCE TO RELATED APPLICATIONS

The application is a divisional of U.S. application Ser. No. 14/132,738, filed 18 Dec. 2013, which issued as U.S. Pat. No. 9,938,845 and which claims priority to and the benefit of U.S. Provisional Patent Application No. 61/769,535, filed 26 Feb. 2013, the disclosures of which are now expressly incorporated herein by reference.

GOVERNMENT RIGHTS

The present application was made with the United States government support under Contract No. FA8650-07-6-2803. The United States government has certain rights in the present application.

TECHNICAL FIELD

The present invention generally relates to moveable flow structures in gas turbine engines, and more particularly, but not exclusively, to gap flows in gas turbine engines.

BACKGROUND

Mitigating and/or reducing a flow of fluid between an end of a movable airfoil member in a gas turbine engine and an adjacent wall remains an area of interest. Some existing systems have various shortcomings relative to certain applications. Accordingly, there remains a need for further contributions in this area of technology.

SUMMARY

One embodiment of the present invention is a unique gas turbine engine moveable airfoil member. Other embodiments include apparatuses, systems, devices, hardware, methods, and combinations for discouraging flow between an end of a variable vane and a wall of a gas turbine engine. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
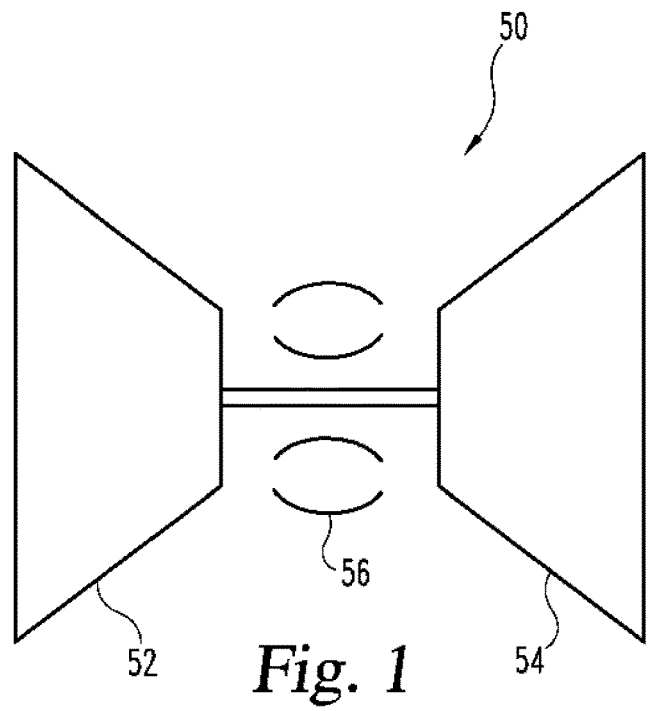
FIG. 1 depicts an embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, one embodiment of a gas turbine engine 50 is depicted which includes turbomachinery components such as a compressor 52 and turbine 54 which operate to produce power. In operation the gas turbine engine 50 produces power by receiving a working fluid into the compressor 52 and compressing, mixing the working fluid with a fuel and combusting the mixture in a combustor 56. The working fluid and/or products of combustion can be expanded in the turbine 54 to produce work before being exhausted downstream of the turbine 54. The turbomachinery of the engine 50 generally includes a rotating bladed rotor, or like device, capable of turning at relatively high speed as a working fluid is passed through the turbomachinery. The gas turbine engine components can also include one or more row of vanes that can be used to turn a fluid flow either upstream or downstream of the bladed rotor. For example, the turbine 54 can include a row of vanes to assist in turning the flow upstream of a row of rotating blades. The vanes can be selectively turned, or pivoted, to change the amount of flow turning upstream of the blades. The gas turbine engine can have any number of blade rows and vane rows depending on the application. Though the vanes can be located immediately upstream of a row of rotatable blades it will be appreciated that the vanes can be placed in other locations, whether or not immediately adjacent upstream of the blades. To set forth just one non-limiting example, the vanes can be an inlet guide vane or an outlet guide vane. The vanes can also be positioned downstream of the rotatable row of blades. Various configurations are contemplated herein.

Though the gas turbine engine 50 is depicted in the illustrated embodiment as a single spool engine, in other embodiments the gas turbine engine can include any number of spools. The gas turbine engine 50 can take on a variety of forms including a turbojet, turbofan, turboshaft, and turboprop engine. In some forms the gas turbine engine 50 can be a variable cycle and/or adaptive cycle engine. In one non-limiting form the gas turbine engine 50 can be used to provide power to an aircraft whether that power is in the form of propulsive thrust, mechanical power, electrical power, or otherwise.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

Figure 2A:
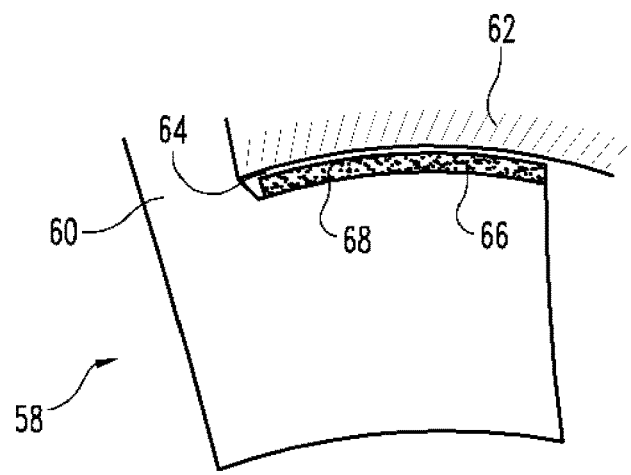
FIG. 2a depicts an embodiment of a brush seal.
Figure 2B:
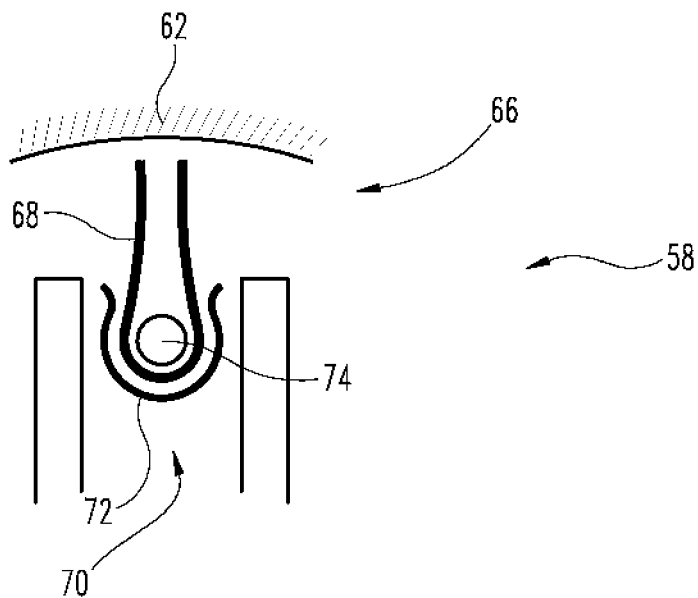
FIG. 2b depicts an embodiment of a brush seal.

Turning to FIGS. 2a and 2b, one embodiment of a turbomachinery component in the form of a vane 58 is depicted having a seal disposed at one end. The vane 58 includes a spindle 60 that can be coupled with an actuation mechanism and used to change a position of the vane 58. For example, the spindle 60 can be coupled directly to an actuator or alternatively can be coupled to an actuator via a common sync ring shared by a number of other vanes 58. The spindle 60 or other suitable structure can be used to support the vane 58 within the flow path of the gas turbine engine such that the vane 58 is cantilevered. In some forms the vane 58 can be supported on both ends of its span. In the illustrated embodiment the vane 58 is shown supported on one end but it will be appreciated that different embodiments may include other variations. The vane 58 can be one of a plurality of variable vanes 58 in a row, all of which can be actuated to change a position to redirect a flow of working fluid through the turbomachinery component. The vane 58 is generally disposed between walls that define a flow path of the gas turbine engine. As shown in the illustrated embodiment the vane 58 is positioned adjacent a wall 62. Though a corresponding wall is not depicted in FIGS. 2a and 2b it will be appreciated that the other wall is in proximity to the opposing side of the vane 58.

The wall 62 of the turbomachinery component is generally non-planar in many embodiments and thus certain embodiments of the vane 58, when pivoted to various positions, creates a gap between the wall 62 and a portion of the vane sometimes referred to as an overhang 64 of the vane 58. The overhang 64 can be designed to permit a movement of the vane 58 such that little to no interaction occurs between the wall 62 and the vane 58. In some forms the vane 58 can be rotated to positions which create contact with the wall 62 of the turbomachinery component. To set forth just one non-limiting example, the overhang 64 may contact the wall of the turbomachinery component at either or both the maximum position and the minimum position thus creating a gap over the portion of vane travel between one or both of the maximum position and minimum position. In any event, the gap between the vane 58 and the wall 62 can be created at some positions of the vane 58 when pivoted and may disappear at other positions when the vane 58 contacts the wall 62. The size of the gap can be the same size along the length of the vane 58, but in some forms the size of the gap can vary depending on the chord location. For example, near a trailing edge of the vane 58 the gap can be larger than at a location nearer a leading edge of the vane 58. Though the illustrated embodiment is depicted having just one wall 62, it will be appreciated that a gap can be formed between the vane 58 and a wall opposing the wall 62. Such a gap can have the same characteristics as the gap discussed above with respect to the vane 58 and wall 62, but some embodiments may include variations between the gaps.

A seal 66 can located between the vane 58 and the wall 62 to discourage a flow of working fluid from one side of the vane to the other, for example from a relatively high pressure side to a relatively low pressure size. In the illustrated embodiment the seal extends from the vane 58 and is in the form of a brush seal having a number of bristles 68 located along a portion of the chord of the vane 58. The bristles 68 can contact the wall 62 at all positions of the vane 58, but in some embodiments one or more portions of the bristles 68 may not contact the wall 62 at all positions. The brush seal 66 can include one or more bristles 68 that are flexible such that when contact is made with the wall 62 the bristles 68 will flex. The flexible nature of the bristles 68 can permit some degree of variation in the gap between the end of the vane 58 and the wall 62 as the vane 58 is rotated to new positions. For example the bristles 68 can flex greater amounts at a position where the gap is small and flex relatively little where the gap is large. The bristles 68 can be made of a variety of materials using a variety of processes. In one non-limiting form the bristles 68 are made of ceramic fiber.

In some embodiments the seal 66 can extend along the entirety of the chord of the vane 58. For example, the brush seal 66 can extend between a leading edge and a trailing edge and be located on both sides of the spindle 60. In some forms the brush seal 66 can be grouped into separate portions. Other variations are contemplated. A brush seal 66 can also be located on the opposite end of the vane 58, though the illustrated embodiment depicts a brush seal on just one end of the vane 58. In those embodiments having brush seals 66 disposed on both ends of the vane 58, the seals 66 can be arranged similarly but in some forms the seals 66 can have different configurations.

The height of the bristles 68 in the brush seal 66 can vary. In one non-limiting form the reach of the bristles 68 between the vane 58 and the wall 62 can vary with chord location. For example, the bristles 68 can be relatively short near the leading edge and relatively long near the trailing edge. Additionally and/or alternatively, the bristles 68 can vary individually regardless of chord location such as variations in bristles that are located near the same chord location.

The brush seal 66 can include groupings of bristles 68. For example, the brush seal 66 can include one grouping disposed toward the suction side and another grouping disposed toward the pressure side of the vane. Additional or fewer groupings can be used in other embodiments. Other variations are also contemplated herein.

FIGS. 2a and 2b depict just one embodiment of the bristles 68 and a mechanism 70 to couple the bristles 68 to the vane 58. The mechanism 70 includes a clamp 72 and a base member 74 around which the bristles 68 are coupled. The clamp 72 is used in the illustrated embodiment to retain the bristles 68 to the base member 74. One or more clamps 72 can be used though the illustrated embodiment depicts just one clamp 72. The clamp 72 can be metallic and in some applications takes the form of a crimp. In some embodiments the mechanism 70 can include bristles 68 that are bonded or affixed to the base member 74 using techniques other than the clamp 72. Other mechanisms are contemplated herein. To set forth just one non-limiting example, the bristles 68 can be individually attached to a base such that they are not wound around a member, such as the base member 74, but rather extend from an attachment.

The base member 74 in the illustrated embodiment includes a circular cross section but other cross sections are contemplated. The member 74 can extend along the chord of the vane 58 a variety of lengths. In some forms the member 74 can be formed integral with the vane 58 while in other forms the member 74 can be coupled to the vane 58 using a variety of techniques. In some forms the base member 74 need not be straight but can rather take on other shapes. Any number of base members 74 can be used.

The base member 74 around which the bristles 68 are coupled can be oriented parallel with an end of the vane 58. In some embodiments the base member 74 can be oriented at an angle whether that angle is measured relative to the vane 58 or relative to the wall 62 when the vane 58 is positioned within the flow path of the gas turbine engine 50. To set forth just one non-limiting example, the base member 74 can be oriented such that a portion located toward the leading edge of the vane 58 is positioned further away from an end of the vane 58 than a portion of the base member 74 located toward the trailing edge.

Figure 3:
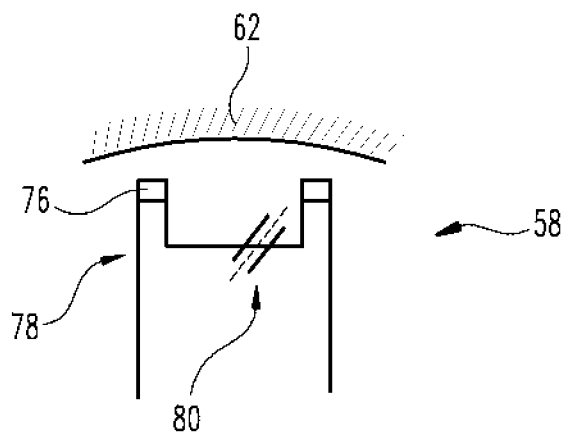
FIG. 3 depicts an embodiment of a wear surface.

Turning now to FIG. 3, another embodiment of the vane 58 is disclosed which includes a wear surface 76 disposed between the vane 58 and the wall 62. In one form the wear surface 76 is configured to be abraded when relative movement causes the vane 58 and the wall 62 to contact each other. The wear surface 76 is shown disposed on the tips of squealer members 78 of the vane 58, but in some forms of the vane 58 the wear surface 76 can be located at the end of the vane 58 whether or not the vane includes the squealer members 78. Both ends of the vane 58 can include the wear surface 76, whether or not both ends also include the squealer members 78. The wear surface can be a coating that is applied to the vane 58 using any number of processes. The wear surface 76 can be configured to provide for variable wear rates and in some forms is made of a different material than the vane 58. In some forms the wear surface 76 can therefore have different material properties, such as density among potential others.

The wear surface 76 can be used to allow for geometric variations in the contact points between the vane 58 and the coating. For example, the wear surface 76 may wear more heavily at a point between a leading edge and a trailing edge of the vane 58. In some applications a side of the wear surface 76 disposed toward one of the pressure side and suction side of the vane 58 may wear more than another side. For example, a squealer member 78 disposed on a pressure side of the vane 58 may experience greater wear of its wear surface 76 than the squealer member 78 disposed toward the suction side of the vane 58. It is also possible that one edge of the squealer member 78 can provide for a greater wear than another edge of the same squealer member. The wear surface 76 may have a variety of thicknesses which can change with its relative location in the vane 58. For example, the wear surface 76 may be thicker near the trailing edge than that near the leading edge of the vane 58. One squealer member 78 can also have a thicker wear surface 76 than another squealer member 78.

The squealer members 78 can be integral to the vane 58, but in some forms the squealer members 78 can be coupled with the vane 58. Though two squealer members 78 are shown, in some embodiments the vane 58 can include fewer or greater numbers of squealer members 78. The squealer member 78 can have a variety of shapes and sizes. For example, in one non-limiting example a squealer member 78 can continuously extend around the vane 58 and have the shape of an airfoil. The squealer can also have a variety of shapes upon which the wear surface 76 is applied. In some forms the wear surface 76 is applied as a coating upon a shape of the tip of the squealer member 78 that is in the form of a relatively flat shelf. In some forms the material that constitutes the wear surface 76 constitutes a majority of the squealer member 78. In other forms the material forming the wear surface is the entirety of the squealer member 78.

In the illustrated form a cooling hole 80 is included in the vane 58, but not all embodiments need include the cooling hole 80. In one form the cooling hole is an effusion hole. The cooling hole 80 can be oriented at an angle, as depicted, or can be normal to a surface of the vane 58 and can be capable of flowing a cooling flow at a variety of flow rates, pressures, and temperatures. Multiple cooling holes 80 can be included in some forms of the vane 58.

Figure 4A:
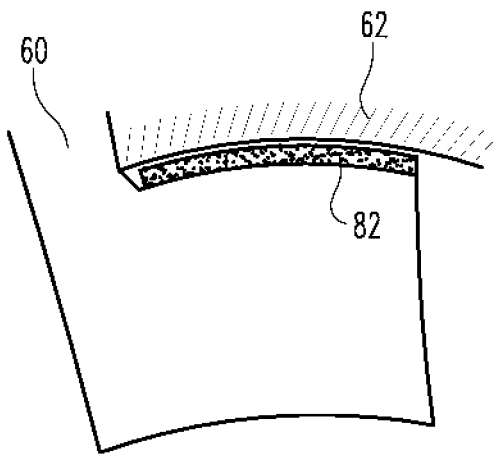
FIG. 4a depicts an embodiment of a moveable member.
Figure 4B:
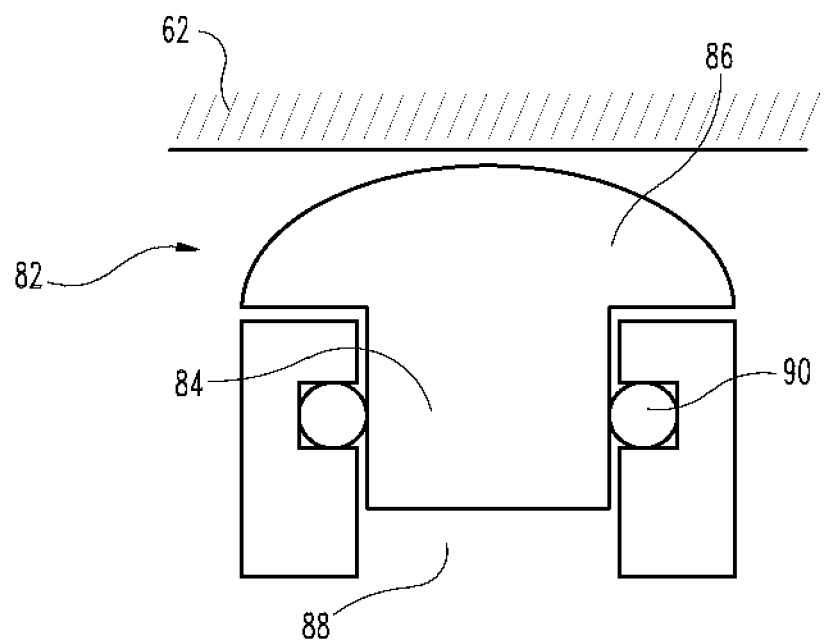
FIG. 4b depicts an embodiment of a moveable member.

FIGS. 4a and 4b disclose yet another embodiment of the vane 58 which includes a moveable member 82 that can be used to modulate and/or close the size of the gap between the vane 58 and the wall 62. In the illustrated form the moveable member 82 includes a piston 84 received within the vane 58 and which includes a head 86 capable of being placed into contact with the wall 62. Other forms of moveable members are also contemplated to modulate and/or close the size of the gap between the vane 58 and wall 62. In some embodiments the shape of the piston may ensure contact between the wall 62 and the vane 58 over the desired range of motion of the vane 58. For example, the shape of an end of the piston can be curvilinear to accommodate interaction with the wall 62. The degree to which the piston shape is curved can be dependent on a particular chord location. The piston can take on other shapes. In operation of the illustrated embodiment a relative pressure difference between an interior 88 of the vane 58 and an exterior of the vane 58, such as the flow path of the gas turbine engine 50, can be used to manipulate a location of the moveable member 82. The relative pressure difference can be modulated using suitable sensors and controls to change the position of the piston. In some forms the pressure can be modulated to selectively engage the piston with the wall 62. To set forth just one non-limiting example, the pressure can be modulated to ensure contact of the piston with the wall 62 over a range of vane positions.

Though the illustrated embodiment depicts a single moveable member 82 disposed on one end of the vane 58, other embodiments can include moveable members 82 at both ends of the vane 58. Alternatively and/or additionally, more than one moveable member 82 can be disposed at any given end of the vane 58. In embodiments having moveable members 82 at both ends of the vane 58, each of the moveable members 82 can be configured independent of the other. To set forth just a few non-limiting examples, the shape and size of the moveable members 82 can be different. The moveable members 82 can be independently or dependently moveable relative to the other.

The piston head 86 is configured in the illustrated embodiment to extend to the sides of the vane 58. In some forms the piston head 86 may extend out of the interior 88 and not include a portion that extends to one or more of the sides of the vane 58. The piston head 86 may also extend to one or more sides of the vane depending on its chord location. For example, in one non-limiting example the piston head 86 may extend to the sides at a location near a leading edge of the vane 58 but may not extend to the sides of the vane 58 near the trailing edge of the vane 58. A variety of configurations are contemplated herein.

The shape and size of the piston head 86 can be different depending on location in the vane 58. For example, the piston head 86 may have a larger thickness between sides of the vane 58 but relatively smaller height as it extends from the vane at a location near the leading edge of the vane 58, while also having a relatively smaller thickness but larger height near the trailing edge of the vane 58.

A seal 90 is disposed between the piston 86 and the vane 58 and is used to discourage a flow of working fluid between the interior 88 of the vane 58 and the flow path of the gas turbine engine. The working fluid can take a variety of forms and in one non-limiting embodiment is a working fluid from the compressor 52 of the gas turbine engine. The seal 90 can take a variety of forms and can include one or more individual seals. In some applications the seal 90 can extend around the periphery of the piston 84 while in other forms the seal 90 may extend around only part of the periphery of the piston 84. Such applications may include additional seals to extend the remainder, or partial remainder around the piston 86. In other forms additional seals can be located at other span locations of the vane 58. In the illustrative embodiment, the rotatable airfoil member is formed to include a cutout that opens into the internal opening and the seal 90 is received in the cutout as shown in FIG. 4b.

The seal 90 can be formed from a variety of materials using a number of different processed. To set forth just a few non-limiting examples of material type, the seal 90 can be made from ceramic or can be metallic. In one non-limiting example, the seal 90 can be a rope seal. The seal 90 can be constructed such that it can expand to engage the piston 84. In some forms the seal 90 can expand to form a relatively secure fit to substantially discourage working fluid from traversing the seal. The seal 90 can expand upon heating and/or may expand as a result of being compressed during an assembly process of the vane 58.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a rotatable airfoil member of a gas turbine engine having a surface that defines an internal opening, the rotatable airfoil capable of being positioned at a plurality of orientations, the rotatable airfoil member operable to be disposed within a flow path of the gas turbine engine;
a fluid obstruction received within the internal opening and configured to engage a wall of the gas turbine engine as the rotatable airfoil member is positioned at the plurality of orientations; and
a seal disposed between the surface that defines the internal opening and the fluid obstruction, the seal structured to discourage a flow of working fluid between the internal opening of the rotatable airfoil member and the flow path of the gas turbine engine,
wherein the fluid obstruction includes a first portion that is received within the internal opening and a second portion that has a convex rounded head configured to engage the wall of the gas turbine engine, the second portion extends away from the first portion beyond the internal opening toward a pressure side and a suction side of the gas turbine engine, and the seal is located between the surface that defines the internal opening and the first portion of the fluid obstruction.

2. The apparatus of claim 1, wherein the fluid obstruction extends along a portion of a chord of the rotatable airfoil member.

3. The apparatus of claim 1, wherein the seal discourages passage of air between a working flow path of the gas turbine engine and an internal space of the rotatable airfoil member and wherein the rotatable airfoil member is a variable turbine vane.

4. The apparatus of claim 1, wherein the seal is a rope seal and wherein the rotatable airfoil member is a turbine vane.

5. The apparatus of claim 1, wherein the rotatable airfoil member is formed to include a cutout that opens into the internal opening and the seal is received in the cutout.

6. An apparatus comprising:
an airfoil member for a gas turbine engine, the airfoil member having a first end and a second end spaced apart radially from the first end relative to an axis, the airfoil member formed to include an interior that opens into the first end;
a wall arranged circumferentially around the first end of the airfoil member; and
a member that extends through the first end of the airfoil member into the interior, the member configured to provide fluid obstruction between the airfoil member and the wall,
wherein the airfoil member includes a pressure side and a suction side spaced apart from the pressure side, the member includes a piston that is located in the interior formed in the airfoil member and a head that is coupled to the piston, the head extends toward the pressure side and the suction side of the airfoil member, and the head has a convex-shaped outer surface when viewed circumferentially.

7. The apparatus of claim 6, wherein the airfoil member is a rotatable vane configured to assume a plurality of orientations relative to the wall.

8. The apparatus of claim 7, further comprising a seal located in the interior and disposed between the airfoil member and the piston and the seal are configured to discourage a flow of working fluid between the interior and a flow path of the gas turbine engine.

9. The apparatus of claim 8, wherein the seal is a rope seal.

10. The apparatus of claim 8, wherein the airfoil member is formed to include a cutout that opens into the interior and the seal is received in the cutout.

* * * * *